US006360846B1

(12) United States Patent
Beal et al.

(10) Patent No.: US 6,360,846 B1
(45) Date of Patent: Mar. 26, 2002

(54) METHOD AND APPARATUS FOR LEAK TESTING AND LUBRICATING TRACK JOINT

(75) Inventors: Ronald C. Beal, Pekin; Darryl J. Brincks, Chillicothe; Robert C. Brown, Peoria; William G. Clelland, III, Lacon; Kevin K. Fanter, Peoria; Gary F. Stewart, Laura; John Styfhoorn, Dunlap, all of IL (US)

(73) Assignee: Caterpillar, Peoria, KS (US)

( * ) Notice: Subject to any disclaimer, the term of this patent is extended or adjusted under 35 U.S.C. 154(b) by 0 days.

(21) Appl. No.: 09/570,702

(22) Filed: May 15, 2000

(51) Int. Cl.[7] ............................................... F16N 17/06
(52) U.S. Cl. ........................................................ 184/58
(58) Field of Search ........................... 184/1.5, 5.1, 7.2, 184/7.4, 55.1, 57, 58

(56) References Cited

U.S. PATENT DOCUMENTS 4,503,806 A * 3/1985 Prusak et al. ................ 118/712
6,170,611 B1 * 1/2001 Daly .......................... 184/6.14

OTHER PUBLICATIONS http://www.wtcmachinery.com/sealtest.html—WTC Machinery Corporation Presses—Seal Test Lubricator for S.A.L.T. Crawler Equipment.

* cited by examiner

Primary Examiner—David Fenstermacher
(74) Attorney, Agent, or Firm—Handcock Estabrook, L.L.P.

(57) ABSTRACT

Apparatus and method for leak testing and adding lubricating oil to enclosed reservoirs of undercarriage components of crawler-type equipment. Barometric pressure is measured by a transducer mounted on a handle from which an elongated wand extends, the wand having a nozzle on the end opposite the handle. The wand is inserted into the reservoir and communication is successively established and terminated between the handle and a source of pressurized nitrogen, a vacuum generator and a source of lubricating oil. After raising the pressure in the reservoir by connecting it to the nitrogen source, pressure is again measured at the end of a wait period to determine if the drop is greater or less than a predetermined amount indicating seal integrity. The vacuum generator is then placed in communication with the handle to lower the pressure within the reservoir to 15% of the previously measured barometric pressure, following which oil is pumped into the reservoir until the pressure therein equals the sum of the barometric pressure and back pressure of the oil flow. Communications are established and terminated by pneumatically operated valves which receive air through solenoid operated pilot valves controlled by a programmable logic controller (PLC). A switch on the handle is actuated by the operator to initiate action of the PLC and an operator keypad is also provided for manually initiating other operations.

20 Claims, 5 Drawing Sheets

Fig_1_

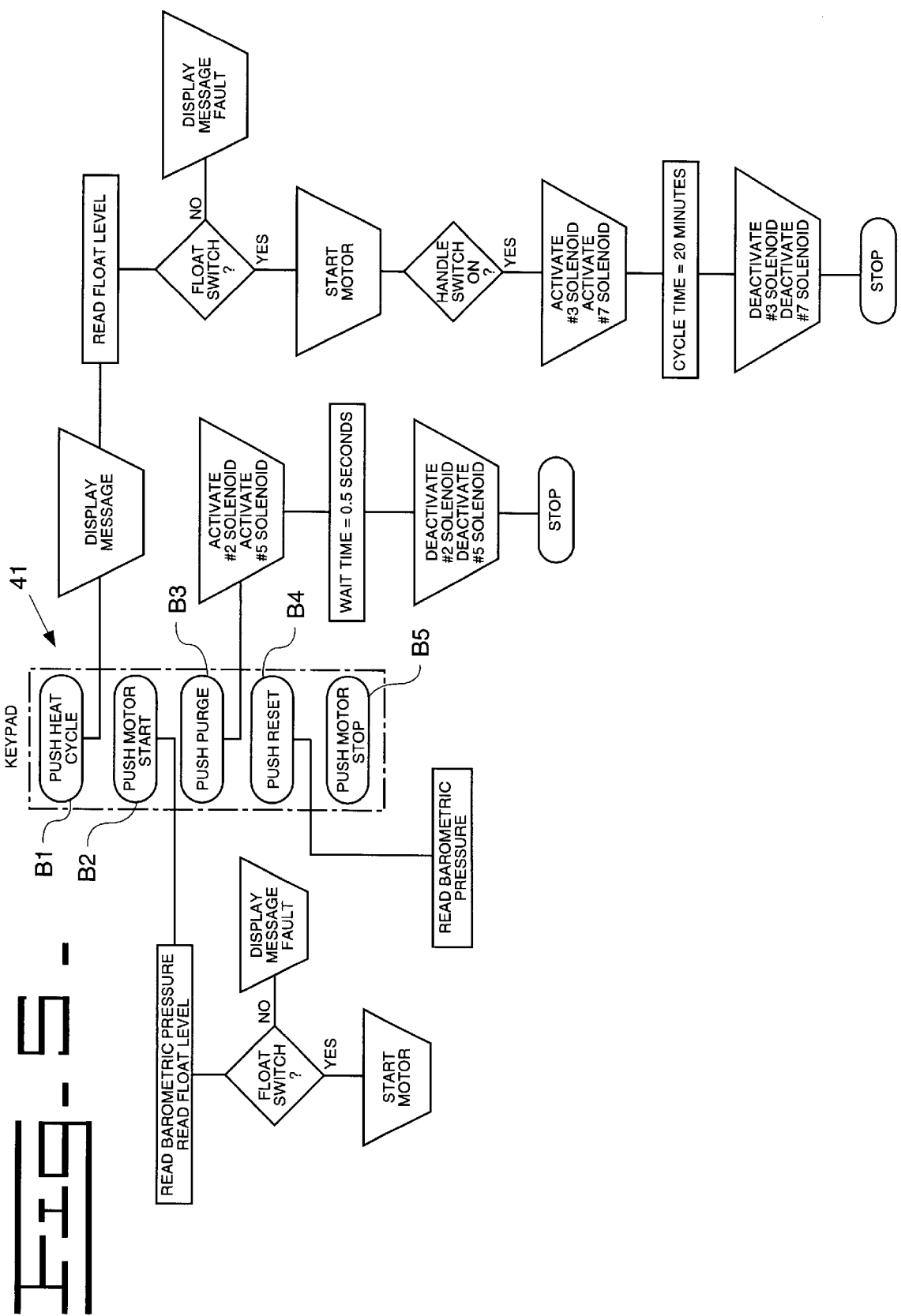

METHOD AND APPARATUS FOR LEAK TESTING AND LUBRICATING TRACK JOINT

TECHNICAL FIELD

This invention relates generally to leak testing and lubrication of sealed joints in the tracks of crawler type equipment and, more particularly, to methods and means for testing the seal integrity of a hollow track joint, followed by insertion of lubricating oil into the joint in a manner which ensures that the joint is filled to a desired degree.

BACKGROUND ART

In a common type of track assembly used in track-laying vehicles and crawler equipment, shoes of appropriate design are pivotally connected by hollow pins containing oil for lubricating opposing surfaces of the pins and surrounding bushings. A type of track known as Positive Pin Retention track was developed by the assignee of the present application to significantly reduce a common cause of lubrication loss in track joints. A pressed-in retaining ring is used to mechanically lock the pin and the link together. End play (sideways movement of the link) is minimized by the retaining ring which prevents relative motion between the link and pin during movement of the track. With essentially no end play, the seals maintain full compression against the ends of the bushings and retain oil in the joint cavities.

Upon initial assembly of the track, as well as in the course of maintenance and repair operations, it is necessary to fill the joint pins to a desired degree with lubricating oil and to ensure that the seals are intact, i.e., that there is no leakage. Leak testing is conventionally performed by applying a vacuum to the sealed area and testing for increases in pressure due to seal leakage. Because the volume of the oil reservoirs within the pins vary, it is not possible simply to place a uniform, measured volume of oil into each pin. In general, it is desirable to fill the pins to 80 to 90% of their capacity under a predetermined pressure which remains essentially constant over an extended period of track use. Presently used methods and apparatus for filling and leak testing track pin lubrication systems are inadequate to meet these desired standards. The present invention is directed to overcoming one or more of the problems or disadvantages associated with the prior art.

DISCLOSURE OF THE INVENTION

The apparatus of the invention includes a handle with an elongated nozzle or wand extending therefrom. The wand is dimensioned for insertion through a passageway in a seal in an undercarriage component. A first hose connects the nozzle, through pneumatically operated valves, to either a vacuum generator or a source of nitrogen at regulated pressure. The nozzle is also connected, through a second hose and pneumatically operated valves, to a source of lubricating oil. Pilot air for actuating the valves is supplied via corresponding solenoid valves which are connected, through appropriate switches, to electrical power. A transducer is mounted in the handle to measure barometric pressure and to measure back pressure of oil flow. The apparatus also includes a keypad having a plurality of function keys or buttons, as well as numeric buttons and indicator lights. To prepare the apparatus for performance of test and fill operations, with the handle resting in a holder attached to the oil tank, first and second buttons on the keypad are pushed to begin heating and circulating oil from the tank through the handle and back to the tank, and to turn on an electric motor connected to the oil pump. The transducer measures back pressure of the oil flow.

The successive steps in the method of the invention begin with measurement of barometric pressure in response to operator activation of a third button on the keypad. Measurement is performed by the handle-mounted transducer and stored in a Programmable Logic Controller (PLC) for use later in the fill cycle. This is followed by operator insertion of the wand into the track component reservoir through the normally plugged opening in the end seal. When the operator is ready for the test and fill cycle to begin, a switch on the handle is actuated, causing subsequent operations to be performed under control of the PLC. The first of such automatically controlled operations is causing nitrogen from the pressurized source to flow through vacuum and nitrogen lines, clearing them of foreign matter. A manually initiated purge of the nozzle is performed by pressing another of the keypad buttons before actuating the handle switch.

The handle is connected through the first hose, by actuation of pilot and pneumatic valves, to the pressurized nitrogen source until pressure within the joint cavity is 20 psi. After a wait of 10 seconds, pressure is again read by the transducer and conveyed to the PLC. If pressure has dropped less than 0.4 psi, seal integrity is acceptable, and communication of the handle through the first hose is switched from the nitrogen source to the vacuum generator. Pressure within the pin cavity is reduced until it reaches 15% of the barometric pressure previously read and stored in the PLC. Communication of the handle with the vacuum generator is then terminated and, by actuation of further solenoid-operated pilot valves and pneumatic valves, the handle is placed in communication, through the second hose, with the source of lubricating oil. Lubricating oil is then pumped to the component reservoir until the pressure reaches barometric plus back pressure, resulting in 80%–90% fill of the component.

BRIEF DESCRIPTION OF THE DRAWINGS

FIGS. 4 and 5 are logic flow charts indicating the various steps in the operations carried out under control of the PLC and the manually actuated buttons, respectively.

BEST MODE FOR CARRYING OUT THE INVENTION

Figure 1:
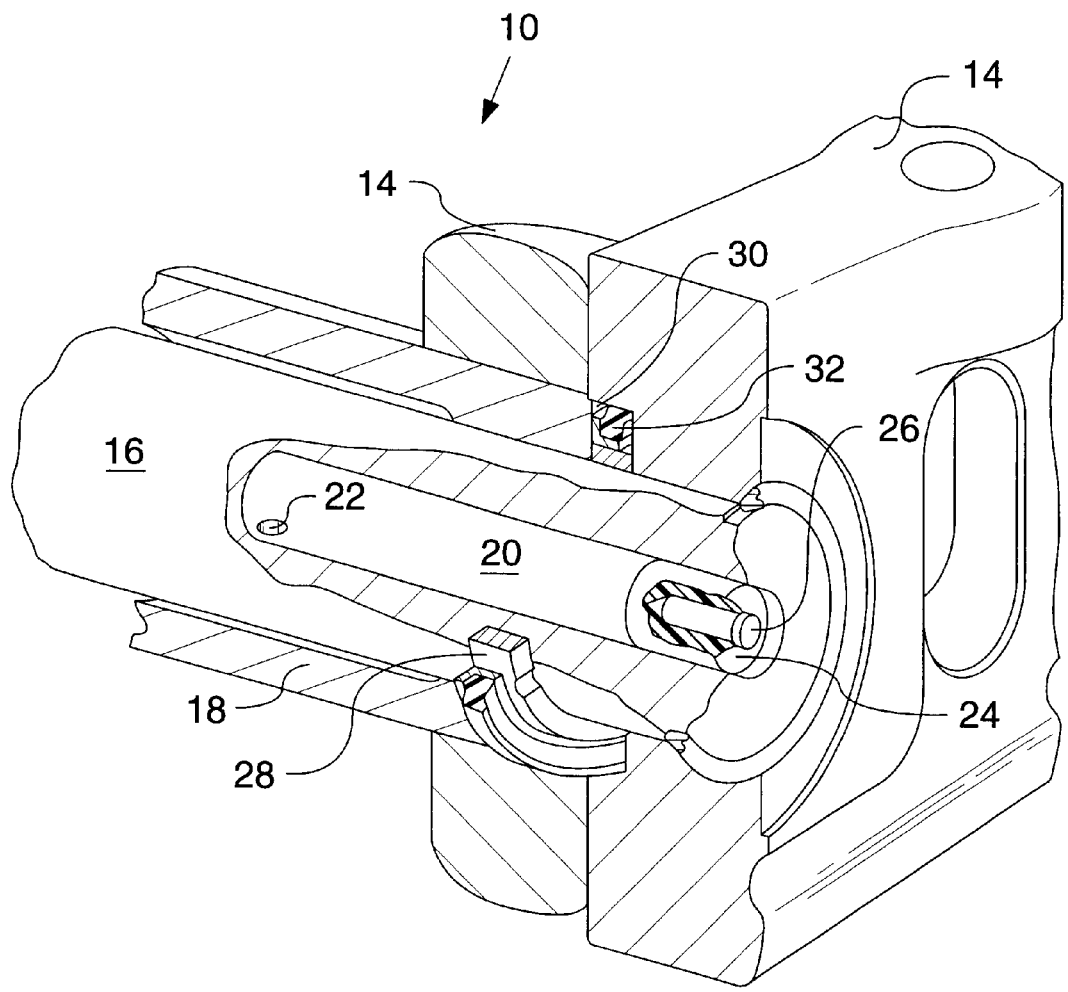
FIG. 1 is a fragmentary, perspective view of portions of a conventional track assembly for crawler-type equipment with portions broken away to better illustrate the manner in which the present invention functions.

Referring now to the drawings, in FIG. 1 there is shown a portion of a conventional track assembly, denoted generally by reference numeral 10, including link 14 and pin 16. An endless track is formed in the usual manner with each segment pivotally connected to leading and trailing segments by pins 16 which are surrounded by bushings 18. Pins 16 includes an axial bore forming oil reservoir 20, communicating through radial bore 22 with the exterior of the pin. The end of reservoir 20 is closed by stopper 24 which also has an axial passageway closed, in the FIG. 1 illustration, by removable plug 26. The narrow annular space between pin 16 and bushing 18 is lubricated by oil passing through radial bore 22 and is sealed at the ends by thrust ring 28, seal ring 30 and load ring 32. It is important for proper lubrication that there is little to no leakage at the seals and that the pin reservoirs are initially filled with a predetermined amount of lubricating oil. The present invention, as will now be explained, is directed to ensuring that proper lubrication of the pins is achieved and maintained.

Figure 2:
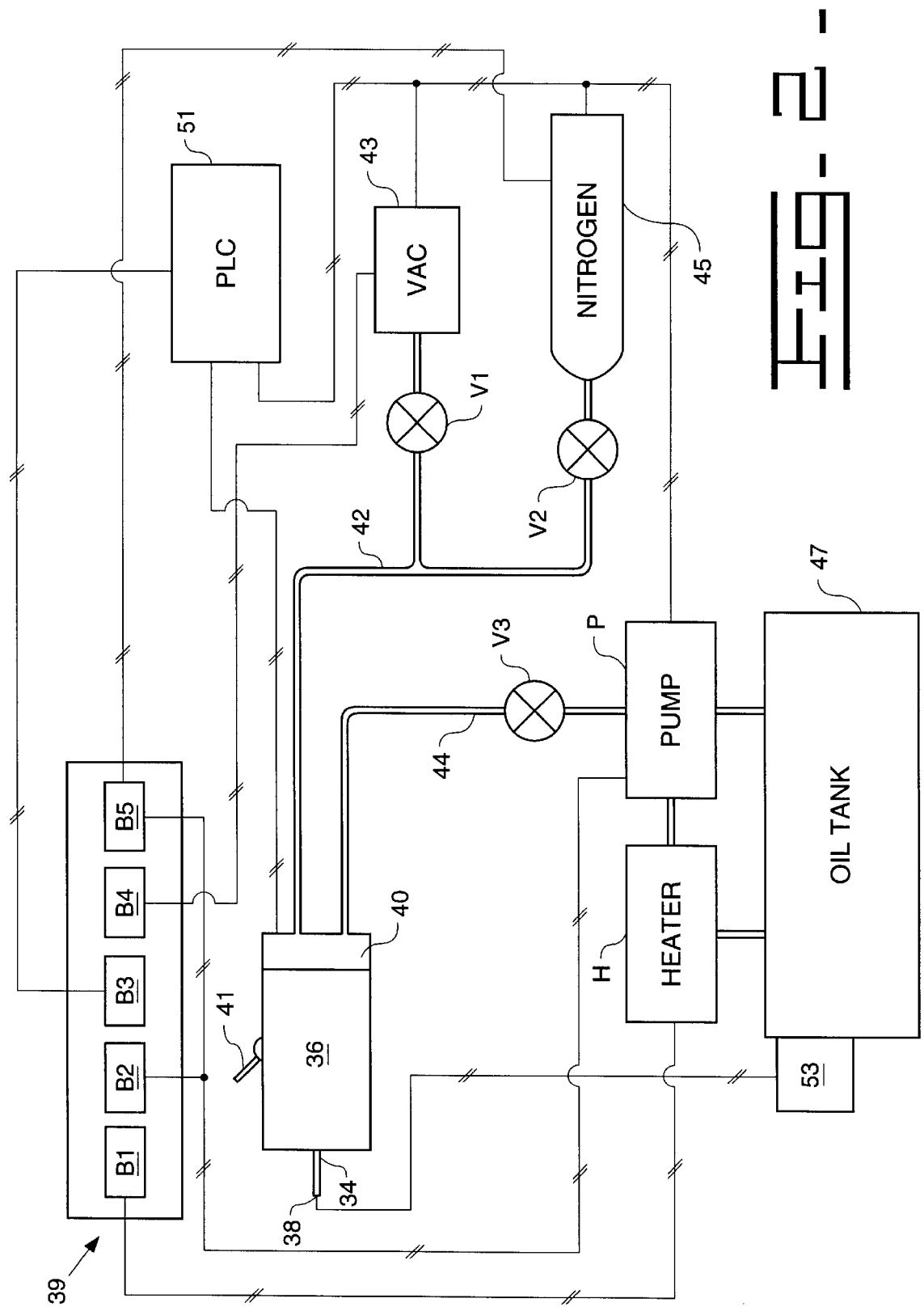
FIG. 2 is a simplified, diagrammatic illustration of the principal components of the apparatus of the invention and the manner of their association.

Turning now to FIG. 2, the apparatus of the invention includes elongated wand 34 which, has a handle 36 and a purge nozzle 38 at proximal and distal ends, respectively. Pressure transducer 40 and manually operable switch 41 are mounted upon handle 36. Handle 36 is connected through a first hose 42 to vacuum generator 43 and nitrogen tank 45, and through a second hose 44 to a lubricating oil source tank 47 containing lubricating oil with which the track components are to be filled. Communication of vacuum generator 43, nitrogen source 45 and oil source 47 with handle 36 is established, in the simplified form illustrated in FIG. 2, through blocking valves V1, V2 and V3, respectively, it being understood that handle 36 communicates with not more than one of these elements at any time. A keypad 39 includes five manually operable buttons B1–B5 also show on the operational flow chart of FIG. 5. Pressing button B1 actuates electric heater H to warm the lubricating oil. Buttons B2 and B5 are connected to the motor which drives pump P for turning the motor on and off, respectively. Pressing button B3 ("reset") causes a PLC 51 to sample and hold a signal from transducer 40 commensurate with barometric pressure. Button B4 is pressed to allow pressurized nitrogen from source 45 to purge nozzle 38, i.e., to blow through the nozzle to remove contamination.

PLC 51, as indicated, is connected to transducer 40, vacuum generator 43, nitrogen source 45 and pump P, in addition to button B3 and switch 41. Initially, buttons B1 and B2 are pressed to acuate a heater H and turn on the motor of pump P. This is done with handle 36 inserted in a handle holder 53 which includes a reservoir in which wand 34 is inserted so that oil circulated through the handle and nozzle is returned to tank 47. Preferably, the apparatus is allowed to operate for about 10 minutes in the heat cycle before continuing the operation. Oil flowing to the handle is heated at all times until oil temperature reaches 110 degrees F.

Button B3 is pressed to cause transducer 40 to read barometric pressure and store a value commensurate therewith in PLC 51. The PLC sends a signal to vacuum generator 43, resulting in the aforementioned automatic purge of the vacuum and nitrogen lines as illustrated by the "PURGE CYCLE" portion of FIG. 4 flow chart. The operator may also press button B4 at this time, purging the handle and nozzle. Handle 36 is then removed from handle holder 53 and wand 34 is inserted into the track component as previously described. The operator then actuates switch 41 and subsequent steps are performed under control of PLC 51. First, nitrogen fills the component cavity until a pressure of 20 psi, i.e., the regulated pressure of the nitrogen supplied to the component, is reached. After a predetermined time, pressure in the cavity is measured and, if pressure drop is less than a predetermined amount, the seal is acceptable. Otherwise, a display (not shown) will read "Major Leak Detected" and the apparatus will not continue to the next step. This portion of the cycle is illustrated by the "pressure test cycle" as shown in the operational flow chart FIG. 4.

Figure 4:
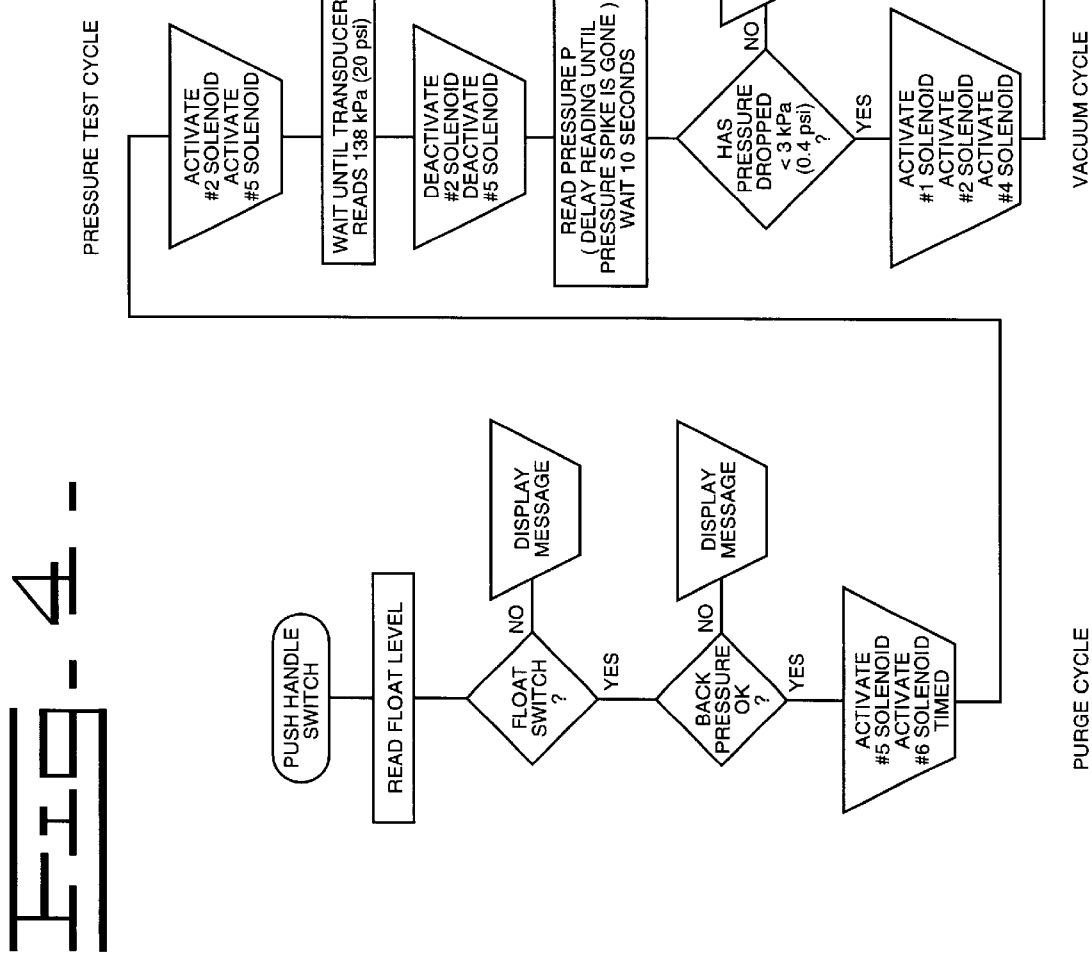

If the component passes the nitrogen pressure test, the PLC initiates the "Vaccuum Cycle" as illustrated in FIG. 4. Communication of handle 36 with vacuum generator 43 is established and the pressure in the component cavity is reduced to 15% of the originally read and stored barometric pressure. Valve V1 is then closed and valve V3 opened to commence the fill cycle or "Fill Process" as illustrated in FIG. 4. PLC 51 actuates pump P and oil is pumped through nozzle 38 until transducer 40 indicates that the pressure has reached a value equal to the sum of the originally measured barometric pressure and the previously read and stored back pressure. This results in reliably filling the component cavity to 80% to 90% of its volume.

Figure 3:
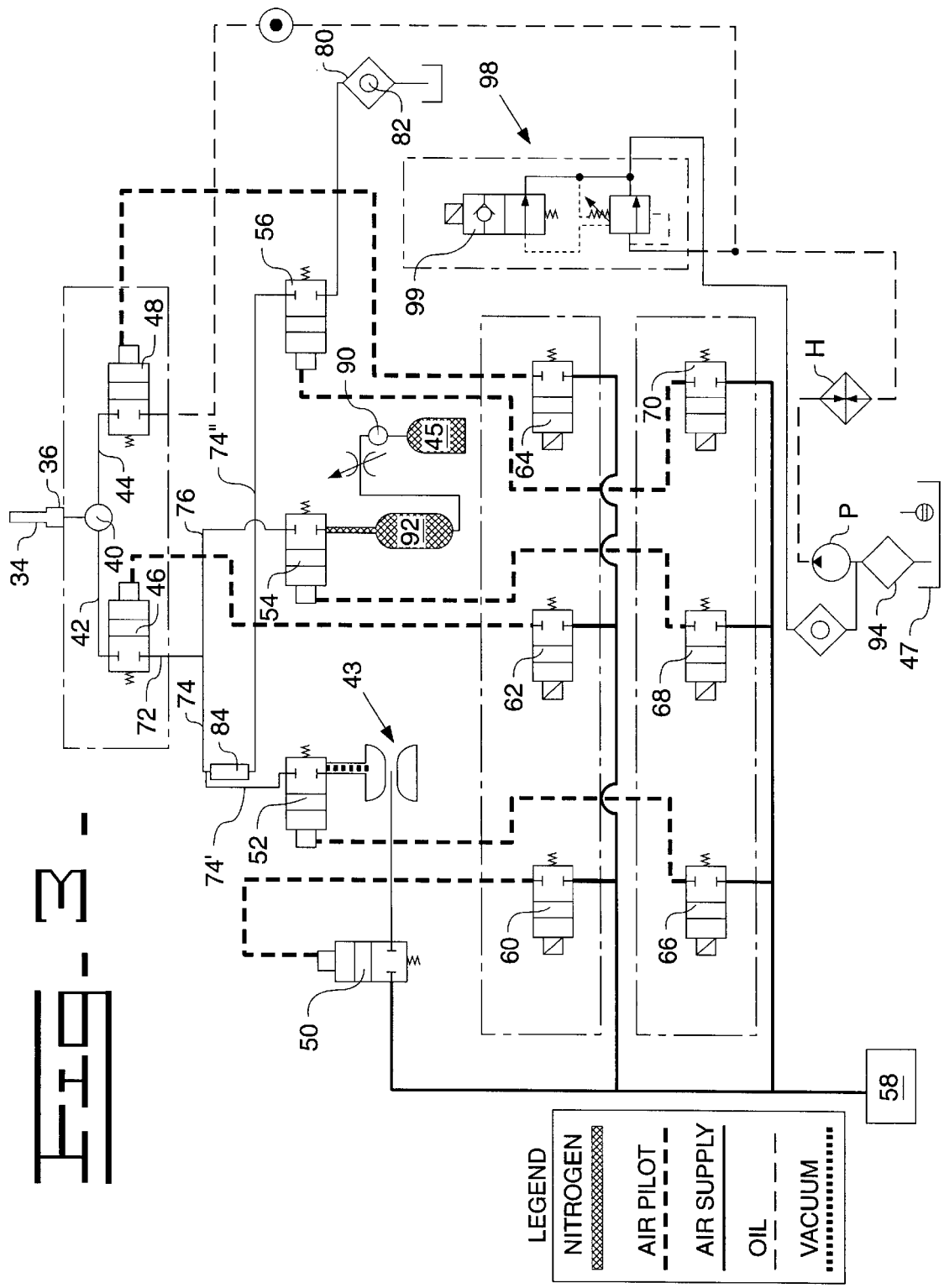
FIG. 3 is a mechanical schematic of the apparatus, in greater detail than FIG. 2.

Referring now to FIG. 3, operation of the apparatus is shown schematically in greater detail. The outlet ports of blocking valves 46 and 48 are connected to hoses 42 and 44, respectively. Valves 46 and 48, as well as four others of the valves shown in FIG. 3, namely, blocking valves 50, 52, 54 and 56, are normally closed, pneumatically actuated, two-way blocking valves. Pilot air for actuating the six blocking valves is supplied from a pressurized air source indicated diagrammatically at 58 via six normally closed, solenoid actuated, pilot valves denoted by reference numerals 60, 62, 64, 66, 68 and 70. For ease of identification, the lines connecting supply air from source 58 to the pilot valves and from the pilot valves to the actuating ports of the respective blocking valves are shown in heavy lines, while the lines connected to the input and output ports of the blocking valves are shown in normal weight lines.

Pilot air for actuating blocking valve 46 is provided via pilot valve 62, thereby placing hose 42 in communication with a line 72, having two branches 74 and 76. Line 72 is connected, via a branch 74' to the outlet port of valve 52, and through branch 74" to the outlet port of valve 56. The actuating ports of valves 52 and 56 are connected to pilot valves 66 and 70, respectively. Actuation of valve 52 places branch 74' in communication with vacuum generator 43, and actuation of valve 56 places line 74" in communication with a water removal element 80, fitted with a filter gauge 82. A catch cannister 84 is positioned in branch 74" (during the automatic purge cycle the catch cannister is purged by nitrogen forcing foreign material into the water filter element). The inlet port of blocking valve 50 is connected to pressurized air source 58, and the outlet port is connected, through line 86, to a pneumatically actuated switch for vacuum generator 43. The vacuum line of vacuum generator 43 is connected to the inlet port of valve 52 for communication with branch 74' of line 74 upon actuation of valve 52, as previously mentioned. Valve 50 is actuated by pilot air from valve 60.

Branch 76 of line 72 is connected to the outlet port of valve 54. Pressurized nitrogen source 45 is connected, through a regulator 90, to a nitrogen supply tank 92. Nitrogen at regulated pressure is provided from tank 92 to the inlet port of valve 54. Air for actuating valve 54 is supplied via pilot valve 68. The inlet port of valve 48 is connected to a source 47 of lubricating oil for supply to the oil reservoir 20 (cavity) of track pins 16 through the line indicated in FIG. 3 by the dashed line. Oil from source 47 passes through strainer 96, pump P and heater H on its way to the inlet of valve 48. Pilot air for opening valve 48 is supplied through solenoid valve 64. Conventional vented relief system 98, including solenoid operated valve 99, is also provided for the oil delivery system, as is a float switch 102.

The solenoid(s) which are actuated under control of the PLC in order to perform the described functions in proper sequence and at proper times are easily identified. Logic flow charts of the operations performed automatically under control of the PLC and those performed in response to operator keypad inputs are shown in FIGS. 4 and 5, respectively. The numbers of the solenoids which are indicated in the flow charts as being activated and deactivated are identified by and correspond to circled numbers in FIG. 3.

Industrial Applicability

It is necessary, upon initial assembly and in the course of maintenance and repair operations of crawler equipment track assemblies 10, to fill reservoirs 20 within joint pins 16 of such assemblies with lubricating oil and to ensure that seals 30 are intact. It is desirable to fill the reservoirs 20 to 80% to 90% of their capacity, but this cannot be accomplished simply by placing a predetermined volume of oil in the reservoir because the reservoir capacity may vary from pin to pin. Accordingly, an elongated nozzle or wand 34 is connected, through a first hose 42 and pneumatically operated valves, to either a vacuum generator 43 or nitrogen tank 45. The wand is also connected, through a second hose 44 and pneumatic valves, to a source of lubricating oil.

Barometric pressure is measured by a transducer 40 mounted on the wand handle 36 and a value commensurate therewith is stored in a Programmable Logic Controller (PLC 51). After purging the vacuum and nitrogen lines 42 and, if desired, the handle 36 and nozzle 38, the wand is inserted into the pin 16 through a normally plugged opening. Switch 41 is then manually actuated and subsequent steps are performed under control of the PLC 51. The reservoir 20 is filled with nitrogen to a regulated pressure and, after a predetermined time, pressure is measured to ensure that seals 30 are intact, i.e., that pressure drop does not exceed an acceptable level, preferably approximately 0.4 psi. The vacuum generator 43 is then placed in communication with the handle 36 to lower the pressure within the reservoir 20 to 15% of the previously measured barometric pressure, following which lubricating oil 47 is pumped into the reservoir 20 until the pressure therein equals the sum of the barometric pressure and back pressure of the oil flow.

Communications are established and terminated by pneumatically operated valves 46, 48 which receive air through solenoid operated pilot valves controlled by the PLC 51. A switch 41 on the handle 36 is actuated by the operator to initiate action of the PLC 51 and an operator keypad 39 is also provided for manually initiating other operations.

What is claimed is:

1. Apparatus for leak testing and adding lubricating oil to an enclosed reservoir within an undercarriage component of crawler-type equipment, an end of said reservoir being closed by a plug having a passageway therethrough, said apparatus comprising:
   a) an elongated wand having a nozzle and a handle at distal and proximal ends, respectively, said wand being dimensioned for axial movement through said passageway to position said nozzle inside and said handle outside said reservoir;
   b) a source of inert gas;
   c) a vacuum generator;
   d) a source of lubricating oil;
   e) a plurality of lines connecting said source of inert gas, said vacuum generator and said source of lubricating oil with said handle;
   f) a plurality of blocking valves each movable between open and closed positions to establish and prevent, respectively, communication between said vacuum generator, said source of inert gas, and said source of lubricating oil, respectively, and said nozzle through said lines; and
   g) a programmable logic controller (PLC) actuable to cause said blocking valves to open and close in predetermined sequence to place said source of inert gas, vacuum generator and source of lubricating oil in communication, one at a time, with said handle (36) and thence said nozzle.

2. The apparatus of claim 1 and further including a manually operable switch for initiating operation of said PLC.

3. The apparatus of claim 2 wherein said switch is mounted to said handle.

4. The apparatus of claim 3 and further including a source of pressurized air, and wherein said blocking valves are pneumatically operated by said pressurized air.

5. The apparatus of claim 4 and further including a plurality of pilot valves operable by said PLC to provide said pressurized air for operation of said blocking valves.

6. The apparatus of claim 1 wherein said source of inert gas and said vacuum generator each communicate with said handle through a first of said plurality of lines.

7. The apparatus of claim 6 wherein said source of lubricating oil communicates with said handle through a second hose.

8. The apparatus of claim 2 and further including a pressure transducer for measuring barometric pressure and storing a value commensurate therewith in said PLC.

9. The apparatus of claim 8 wherein said pressure transducer is mounted in said handle and also measures back pressure of lubricating oil flowing through said handle and provides a signal commensurate with the value of said back pressure to said PLC.

10. The apparatus of claim 9 wherein said PLC causes said blocking valve through which said source of lubricating oil communicates with said handle to close, thereby blocking communication of said source of lubricating oil with said nozzle in response to the sum of said barometric and said back pressure reaching a predetermined value.

11. The method of leak testing and adding lubricating oil to an enclosed reservoir of an undercarriage component of crawler-type equipment, said method comprising:
    a) measuring barometric pressure and storing a value commensurate with the value thereof;
    b) introducing a pressurized gas into said reservoir until the pressure therein reaches a predetermined value;
    c) measuring pressure in said reservoir a predetermined time after said pressure reaches said predetermined value and comparing the value of measured pressure to said predetermined value;
    d) lowering the pressure within said reservoir to a predetermined percentage of said barometric pressure; and
    e) adding lubricating oil to said reservoir while measuring the back pressure of said oil until the sum of said barometric and back pressures equals a predetermined value, resulting in filling of said reservoir within predetermined limits.

12. The method of claim 11 wherein said pressurized gas is nitrogen.

13. The method of claim 11 wherein said predetermined percentage is about 15%.

14. The method of claim 11 wherein said predetermined limits are about 80% to 90% of the volume of said reservoir.

15. The method of claim 11 wherein said pressure in said reservoir is increased to said predetermined value by establishing communication between a source of nitrogen at regulated pressure and said reservoir.

16. The method of claim 15 wherein said pressure within said reservoir is lowered by establishing communication between a vacuum generator and said reservoir.

17. The method of claim 16 wherein said lubricating oil is added to said reservoir by establishing communication between a source of said oil and said reservoir and pumping said oil into said reservoir until the sum of said barometric and back pressure reaches said predetermined value.

18. The method of claim 17 wherein said communication between said source of nitrogen and said reservoir is terminated prior to establishing said communication between said vacuum generator and said reservoir, and said communication between said vacuum generator and said reservoir is terminated prior to establishing communication between said source of oil and said reservoir.

19. The method of claim 18 wherein each of said communications is established and terminated under control of a programmable logic controller (PLC).

20. The method of claim 19 and further including manually initiating operation of said PLC, which then automatically proceeds to establish and terminate said communications.

* * * * *